United States Patent [19]

Hooper et al.

[11] Patent Number: 4,914,328
[45] Date of Patent: Apr. 3, 1990

[54] ELECTRICAL MACHINE WITH A SUPERCONDUCTING ROTOR HAVING AN IMPROVED WARM DAMPER SHIELD AND METHOD OF MAKING SAME

[75] Inventors: George D. Hooper, Murrysville; True T. Shih, Monroeville, both of Pa.

[73] Assignee: Electric Power Research Institute, Palo Alto, Calif.

[21] Appl. No.: 569,889

[22] Filed: Jan. 11, 1984

[51] Int. Cl.⁴ .............................................. H02K 9/00
[52] U.S. Cl. ...................................... 310/52; 138/142
[58] Field of Search ............... 310/52, 40 R; 138/261, 138/142, 143

[56] References Cited

U.S. PATENT DOCUMENTS

| | | | |
|---|---|---|---|
| 4,123,676 | 10/1978 | Cooper et al. | 310/52 |
| 4,152,609 | 5/1979 | Cooper et al. | 310/52 |
| 4,385,248 | 5/1983 | Lashavis | 310/52 |
| 4,432,411 | 2/1984 | Hooper | 310/52 |
| 4,529,669 | 7/1985 | Mori | 310/52 |

FOREIGN PATENT DOCUMENTS 663029  5/1979  U.S.S.R. .................. 310/52

Primary Examiner—Nelson Moskowitz

[57] ABSTRACT

An electrical machine with a superconducting rotor is constructed with a warm damper shield that uses a composite cylindrical assembly of a conductive core in a plurality of inner and outer support tubes. The conductive core is joined to axially adjacent end cylinders of high strength material by the use of mating grooves in the adjacent elements which permits them to be subjected to the forces resulting from the explosive welding of the inner and outer support tubes without damage thereto.

9 Claims, 2 Drawing Sheets

ELECTRICAL MACHINE WITH A SUPERCONDUCTING ROTOR HAVING AN IMPROVED WARM DAMPER SHIELD AND METHOD OF MAKING SAME

BACKGROUND AND SUMMARY OF THE INVENTION

This invention relates to dynamoelectric machines, particularly to machines with a superconducting rotor, and to the construction and method for making a warm damper shield for a supercooled rotor.

Superconducting generators have been designed with a supercooled direct current field winding on the rotor. The field winding requires shielding against disturbances that may cause amplitude variations in its direct current that could result in quenching of its superconducting properties. It has been recognized that to achieve these purposes one may use a rotor that includes on its outer or warm surface over the field winding a damper shield that shields against AC fields in the air gap caused by harmonics in the stator and unbalanced loads and also acts as a damper against oscillations due to transients in the stator.

Various aspects of warm damper shields in superconducting rotors are dealt with in Cooper et al U.S. Pat. No. 4,123,676, Oct. 31, 1978, Cooper et al U.S. Pat. No. 4,152,609, May 1, 1979, and copending application Ser. No. 350,527, filed Feb. 19, 1982 by Hooper and assigned to the present assignee, the disclosures of which are herein incorporated by reference. U.S. Pat. No. 4,152,609 has particularly to do with the construction of a warm damper shield consisting of a central cylinder of a conductor such as copper or aluminum with the inner and outer concentric cylinders joined thereon of a high strength, less conductive material, such as one of the superalloys commercially available under the name Inconel. Such a composite cylinder has the ability to provide the necessary electromagnetic and mechanical functions of the warm damper shield and is utilized as part of the present invention.

It is necessary to assemble the structure so that there is a metallurgical bond between the central conductive cylinder and the stronger inner and outer cylinders. Strength is essential as the forces that can be applied to the warm damper assembly due to a possible line fault are about an order of magnitude greater than the centrifugal forces encountered during normal operation of the rotor at 3600 rpm. The requirement for thorough metallurgical bonding has been best achieved by the method of the copending application involving explosive welding of the inner and outer cylinders to the central cylinder. The end portions of the damper shield are a concern however because it is desirable to have high strength material at these regions without the weaker conductive material extending to the extremity of the shield. The ends have to be strong throughout their thickness especially so they can be drilled and tapped to receive bolts fastening them to the end shafts. The required hole size may be greater than the thickness of the central cylinder.

As presented in the copending application there are end cylinders of high strength material axially adjacent the central conductive cylinder and soldered or brazed thereto prior to the explosive welding of the inner and outer support cylinders. While generally feasible, there is need for improved techniques so as to insure against voids and possible crack initiation at the interfaces between the central copper cylinder and the axially adjacent high strength material. While soldering or brazing of the end cylinders to the conductive cylinder is reliable to form the preassembly of those elements, problems can arise upon the explosive welding to that preassembly of the inner and outer support cylinders. Explosive welding inherently produces large forces on the elements that can disturb the metallurgical integrity of the previously formed joints.

These concerns are addressed by the present invention that provides an improved warm damper assembly for a superconducting rotor by a method that involves machining mating grooves in end portions of the conductive core cylinder and the adjacent end portions of higher strength end cylinders and fitting those elements together at the mating grooves prior to the explosive welding of the inner and outer support cylinders. This technique may be performed without solder or brazing material at the groove joint but such material may also be employed if desired for additional security. In a preferred form, the grooves of the mating pieces are screw threads and the end cylinders are assembled to the central cylinder by screwing them on.

DESCRIPTION OF THE PREFERRED EMBODIMENT

Figure 1:
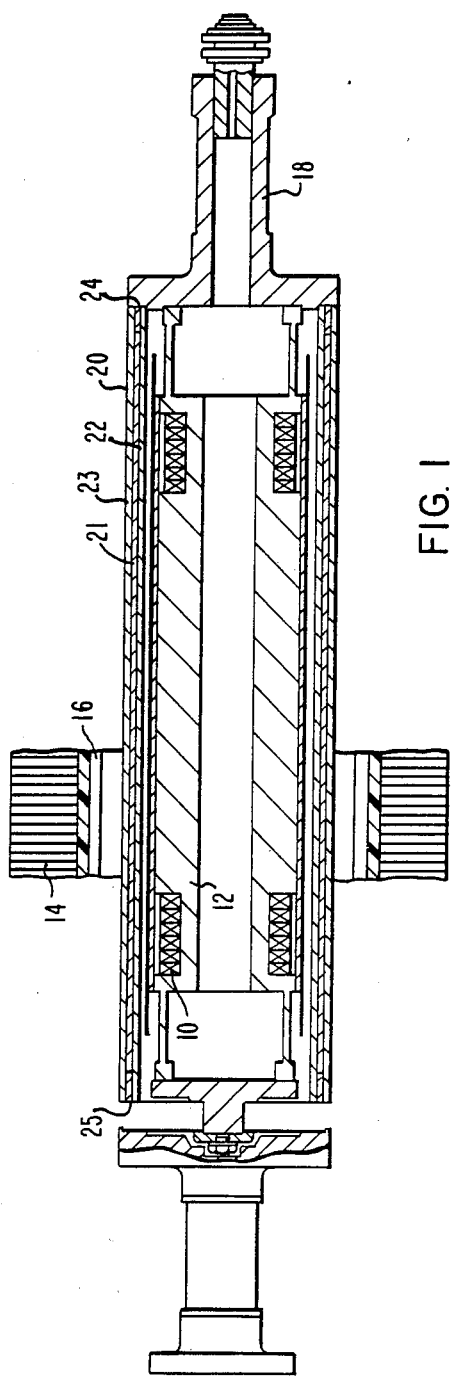
FIG. 1 is a side view of a generator including a superconducting rotor suitable for application of the present invention thereto.

Referring to FIG. 1, a dynamoelectric machine is illustrated, that is an AC generator with a superconducting DC field winding 10 on a rotor 12. The machine also comprises a stator 14 with a stator winding 16. Rotor 12 on a shaft 18 is located within the stator. The stator 14 and its winding 16 are only partially shown in FIG. 1. The rotor 12 carries the supercooled field winding 10 enclosed within a structure that includes, for example, a retaining cylinder and a radiant heat shield within a vacuum shell, the details of which are not shown. Outside the vacuum shell of the rotor 12 is a warm damper shield 20 with which the present invention is particularly concerned. Damper shield 20 comprises over a major portion of its length a central cylinder 21 of highly conductive material such as copper, aluminum, or alloys of copper or aluminum (zirconium-copper and OFHC copper are more specific examples), with inner and outer support cylinders 22 and 23 metallurgically bonded to it of a high strength, less conductive material such as one of the superalloys, for example that available commercially under the name Inconel 706. The outer damper 20 has a fixed attachment at at least one end 24 to the rotor but may have a flexible attachment at its other end 25 such as in accordance with U.S. Pat. No. 4,123,676.

Figure 2:
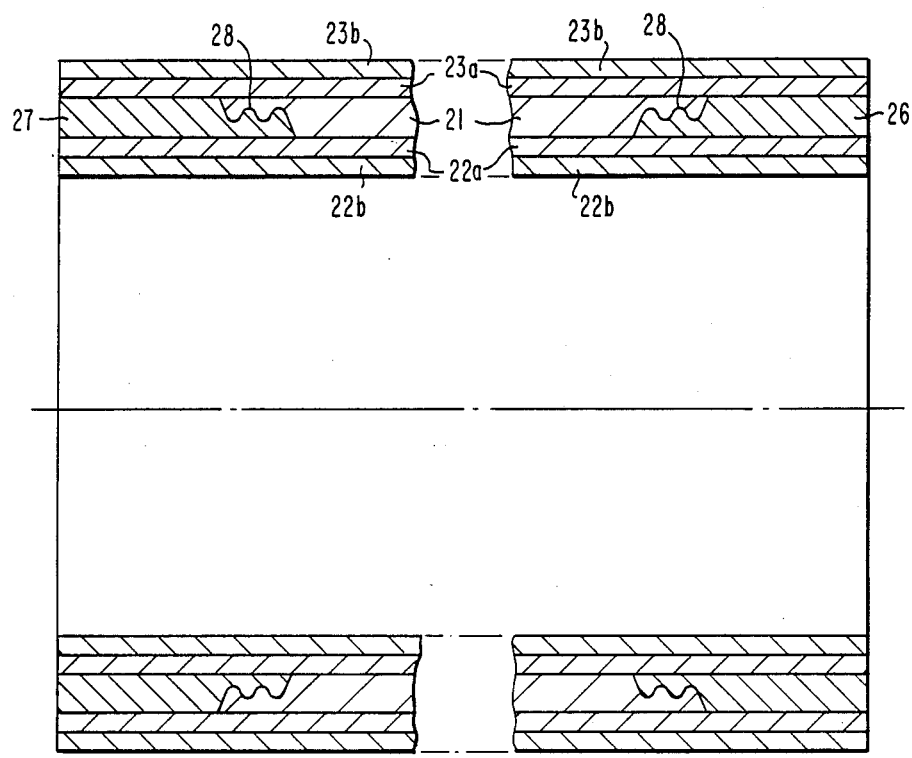
FIG. 2 is a cross-sectional view of a warm damper shield in accordance with the embodiment of the present invention for use in the generalized structure of FIG. 1.

FIG. 2 shows more specifically the structural features and nature of the end portions of the damper shield 20. As seen here the central core cylinder 21 terminates a distance from each end of the damper shield 20 and is there joined with end cylinders 26 and 27 of high strength material, such as Inconel 706, in a manner in accordance with the present invention that includes having mating grooves 28 within the adjacent axial elements 21, 26 and 27 that can be fit together to provide a unitary cylinder of uniform inner and outer dimensions. To the central cylinder of the core cylinder 21 and end cylinders 26 and 27 there is formed on its surfaces by explosive welding additional cylinders of high strength material. In this example these include two such cylinders on each side, inner support cylinders 22a and 22b and outer support cylinders 23a and 23b, for an overall structure that is substantially free of voids that performs with high strength under the conditions to which the superconducting rotor 12 is subjected and, by the conductivity of the central core 21, shields the rotor winding 10 from the effects of fields in the air gap and the like.

Proceeding with a description of the method by which the damper assembly 20 is formed, the separate pieces 21, 22a, 22b, 23a, 23b, 26 and 27 of the assembly are processed, such as by cold working, including cold roll extrusion, to provide relatively high strength elements. The superalloy (e.g. Inconel 706) pieces can be solution annealed and aged to obtain maximum properties after final cold working.

After the core cylinder 21 and end cylinders 26 and 27 are initially formed of uniform inner and outer dimensions, mating end regions are subjected to a machining operation to provide the mating grooves 28 therein. As depicted in FIG. 2, the grooves are formed in the inner surface of the ends of core cylinder 21 and in the outer surfaces of the ends of the end cylinders 26 and 27. It is however to be understood that the grooving operation may be reversed and that each end of the warm damper 20 need not be identically grooved.

In the case in which the grooves 28 are separate, substantially parallel and identical grooves, it is then necessary to expand one of the elements, the core cylinder 21 in the example shown in FIG. 2, sufficiently to allow the end cylinders 26 and 27 to be inserted therein and to have them mate at the grooves 28. Thermal expansion and shrinking is not employed for this purpose because of danger of destroying the cold worked properties of the copper piece 21. Mechanical expansion is possible but is an undesirable technique in view of the size of the elements involved. It also may result in a greater need for further reduction by cold working or machining to completely work the unit back into a uniformly dimensioned continuous cylinder.

In accordance with a more preferred technique, the grooves 28 at each end of the central cylinder elements 21, 26 and 27 are essentially screw threads, that is, continuous spiral grooves, that permit the mating elements to be screwably joined or threaded together without heating or mechanical expansion to result in a uniformly continuous cylinder normally without need for subsequent machining. No additional cold working is required for the screwed together elements except that occurring in the subsequent explosive welding operation.

In either form of assembly, soldering or brazing can be performed if desired at the mating grooved joint 28, but it is advantageous that the technique of this invention does not require reliance on soldering or brazing for achieving a good joint, free of voids, and high strength throughout the structure to the extent of the technique of the copending application. If soldering or brazing is done, care must be taken to do it at a temperature below that at which the cold worked properties of the copper 21 would be damaged.

After the central cylinder is formed as described, the inner and outer shells 22 and 23 are explosively welded to it and, as shown in the example of FIG. 2, may each comprise more than one individual shell where successive ones are explosively welded to the prior welded ones.

Explosive welding provides well bonded joints over the major surfaces of the cylinders. The problem with it is that it imposes such forces on the elements that the previously formed joints of the central cylinder are highly stressed. The problems are aggravated by the large dimensions of the element as they are required for a superconducting rotor. For example, for a superconducting rotor of the 300 MVA generator, the following table presents the design dimensions:

| Element | Approx. Dimension |
| --- | --- |
| Damper shield 20, Overall Length | 153.75 in. (390 cm.) |
| End Cylinders 26 and 27, Length (including grooved portion) | 10.0 in. (25.4 cm.) |
| Grooved joint 28, Length | 5.0 in. (12.7 cm.) |
| Grooved joint 28, Depth and Pitch | 3/16 in. (0.5 cm.) |
| Damper shield, 20, Inner diameter of cylinder 22b | 31 in. (79 cm.) |
| Damper shield 20, Outer diameter of cylinder 23b | 37.5 in. (95 cm.) |
| Core cylinder 21 and End Cylinders 26 and 27, thickness | 1.0 in. (2.5 cm.) |
| Inner and Outer Cylinders 22a, 22b, 23a, 23b, thickness (each) | 9/16 in. (1.4 cm.) |

The dimension of the table indicate how large are the areas of the joints involved in the structure of this example and the length of the joints of the central cylinder that are subjected to the large forces of the explosive welding process, i.e., roughtly about 100 in. (250 cm.) in circumference. Ensuring close contact with no significant separation over the entirety of such extensive joints is, however, achievable by the practice of this invention despite the large dimensions and the large forces incurred in explosively welding the additional cylinders. Generally speaking, the present invention is regarded as particularly advantageous and desirable in constructing warm dampers of at least about 50 cm. in diameter and at least about 200 cm. in length.

It is therefore seen that the present invention provides an improved means to hold components of the central cylinder of the dissimilar metals together in such a manner so as to substantially prevent voids from forming as the explosive welding forces are applied over the joints. A warm damper shield results that is effective in the operation of a superconducting rotor even when subjected to perturbations normally encountered in machine operation.

We claim:

1. A method of assembling a damper capable of use on a rotor having a superconducting winding comprising the steps of:
    providing a core cylinder of electrically conductive metal;
    providing two end cylinders each of metal of higher strength and lower electrical conductivity than said core cylinder and each having inner and outer diameters substantially matching those of said core cylinder;

machining mating grooves in a first end portion of said core cylinder and in an end portion of a first of said end cylinders;

machining mating grooves in a second end portion of said core cylinder and in an end portion of a second of said end cylinders;

fitting together said first end portion of said core cylinder and said end portion of said first end cylinder and fitting together said second end portion of said core cylinder and said end portion of said second end cylinder to form a central cylinder comprising said core cylinder and said first and second end cylinders;

explosively welding an outer cylinder of metal of higher strength and lower electrical conductivity than said core cylinder to the entire outer surface of said central cylinder; and, explosively welding an inner cylinder of metal of higher strength and lower electrical conductivity than said core cylinder onto the entire inner surface of said central cylinder.

2. A method of assembling a damper in accordance with claim 1 further comprising:

cold working at least said core cylinder prior to said machining and said fitting together.

3. A method of assembling a damper in accordance with claim 2 further comprising:

cold working said central cylinder after said machining and fitting together of said core cylinder and said end cylinders and prior to said explosively welding.

4. A method of assembling a damper in accordance with claim 1 wherein:

said mating grooves are in the form of screw threads and after said machining and fitting together of said core cylinder and said end cylinders and prior to said explosively welding no cold working operations are performed thereon.

5. A method of assembling a damper in accordance with claim 1 wherein:

said fitting together of said core cylinder and said end pieces and said explosively welding of said inner and outer cylinders to said central cylinder is performed to result in close contact between the adjacent elements without use of solder or brazing compound therebetween.

6. A method of assembling a damper in accordance with claim 1 wherein:

said fitting together of said core cylinder and said end pieces is performed after first applying solder or brazing compound to said grooves.

7. A dynamoelectric machine comprising:

a stator with a stator winding; a rotor on a shaft with a superconducting winding thereon located within said stator and with a warm or enter damper shielding said superconducting winding from external magnetic fields of said stator winding;

said damper comprising a metallurgically bonded cylindrical composite having ends fastened to said shaft; said cylindrical composite comprising a copper containing core cylinder, an end cylinder at each end of said core cylinder, an inner cylinder within said core cylinder and said end cylinders and an outer cylinder around said core cylinder and said end cylinders where said end cylinders and said inner and outer cylinders are all of metal of higher strength and lower electrical conductivity than said core cylinder; and, said core cylinder and said end cylinders are fitted together with mating grooves.

8. A dynamoelectric machine in accordance with claim 7 wherein:

said end cylinders and said inner and outer cylinders are all of a superlalloy and said inner and outer cylinders are explosively welded to said core cylinder and cylinders.

9. A dynamoelectric machine in accordance with claim 8 wherein:

said mating grooves of said core cylinder and said end cylinders are screw threads.

* * * * *